United States Patent [19]
Robbins

[11] Patent Number: 5,315,764
[45] Date of Patent: May 31, 1994

[54] METHOD AND APPARATUS FOR APPLYING ALPHANUMERIC CHARACTERS TO THE SIDWALL OF A TIRE

[76] Inventor: Jimmy H. Robbins, R-7 B-897, Haleyville, Ala. 35565

[21] Appl. No.: 986,559

[22] Filed: Dec. 7, 1992

[51] Int. Cl.$^5$ .............................................. B60C 13/00
[52] U.S. Cl. ........................................ 33/613; 33/16; 156/116; 152/524
[58] Field of Search ................. 33/613, 1 F, 1 G, 203, 33/600, 614, 645, 677, 562, 563, 566; 156/116, 110.1, 394.1; 152/524, DIG. 12

[56] References Cited

U.S. PATENT DOCUMENTS

| | | | |
|---|---|---|---|
| 2,802,512 | 8/1957 | Rouse | 156/116 |
| 3,128,815 | 4/1964 | Nonnamaker | 152/524 |
| 3,218,208 | 11/1965 | Molen | 156/116 |
| 3,258,050 | 6/1966 | Nonnamaker | 152/524 |
| 4,041,652 | 8/1977 | Graven et al. | 156/116 |
| 4,256,159 | 3/1981 | Williams | 156/116 |
| 4,295,275 | 10/1981 | Cugini, Sr. et al. | 33/16 |
| 4,317,479 | 3/1982 | McDonald | 156/116 |
| 4,318,436 | 3/1982 | Shurman | 156/116 |
| 4,343,342 | 8/1982 | McDonald | 152/524 |

OTHER PUBLICATIONS

"Tints for Tires"—Life Oct. 13, 1952, p. 103.

Primary Examiner—William A. Cuchlinski, Jr.
Assistant Examiner—C. W. Fulton
Attorney, Agent, or Firm—Hopkins & Thomas

[57] ABSTRACT

A method and apparatus for applying personalized alphanumeric characters and the like to the sidewall of a tire is disclosed. The method allows a tire owner to adorn the tires with a desired name, phrase, slogan, logo, etc., quickly and at low cost. In addition, the apparatus allows the tire owner to space the characters properly on the sidewall to ensure a professional appearance.

5 Claims, 2 Drawing Sheets

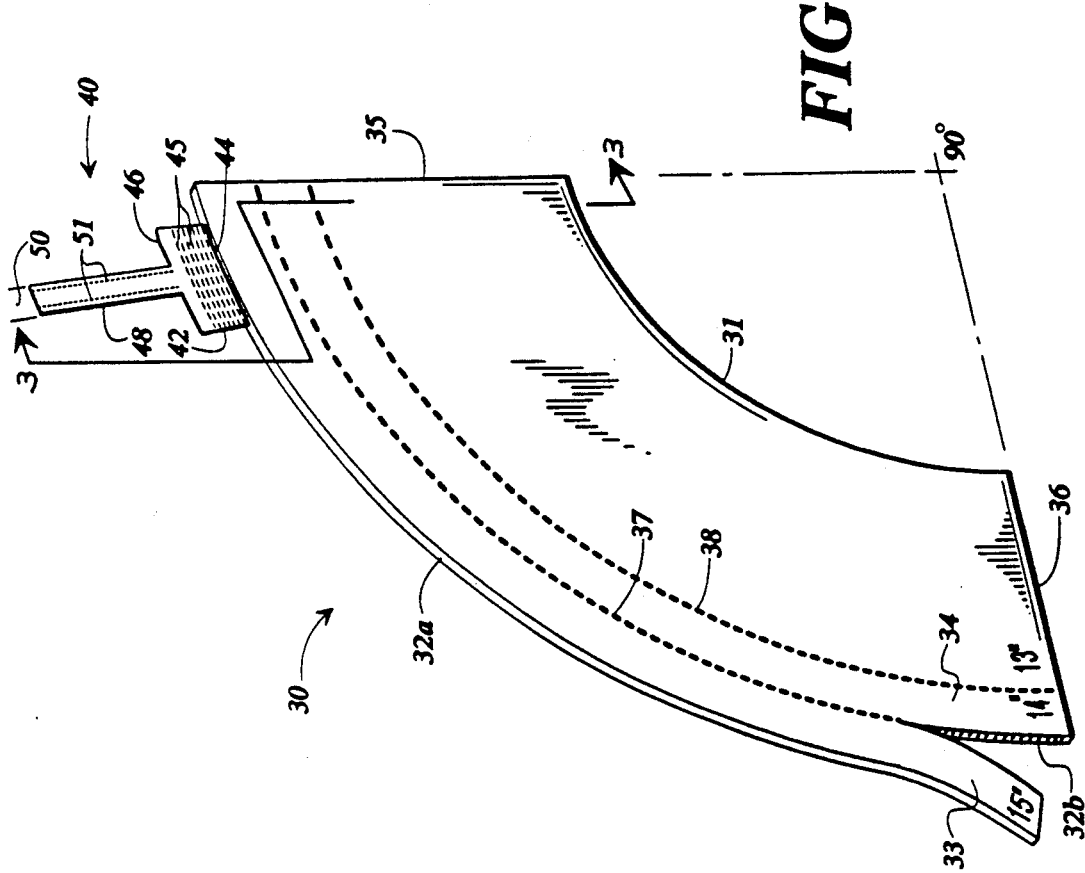
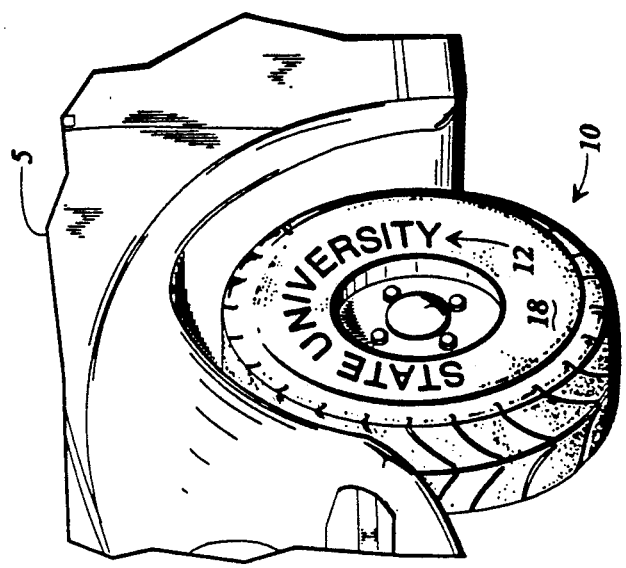

METHOD AND APPARATUS FOR APPLYING ALPHANUMERIC CHARACTERS TO THE SIDWALL OF A TIRE

FIELD OF THE INVENTION

The subject invention relates to a method and apparatus for applying personalized alphanumeric characters to the sidewall of an automobile tire or the like.

BACKGROUND OF THE INVENTION

At the present time there continues to be an appreciable commercial demand for tires having sidewalls or portions thereof of different color than the remainder of the tire. Normally tires have a black tread and sidewall but the provision of raised, generally white, letters or colored areas in the tire sidewalls has been in great demand by the public and is being provided by virtually all tire manufacturers. These decorative sidewalls are usually built integrally with the tires by well known procedures. However, such decorative sidewall tires are costly to build and involve relatively expensive manufacturing procedures. In addition, the integrally-built sidewalls generally display the name, brand or serial number of the manufacturer rather than a personalized name or phrase desired by the owner of the tire.

While efforts have previously been made to provide removable or personalized types of sidewall trim members that can be affixed in or to a pneumatic tire sidewall, the method of securing such members to the sidewall generally requires the use of specially manufactured or modified tires, rather than the use of standard pneumatic tires. Such methods are described in U.S. Pat. Nos. 3,128,815 and 3,258,050 to Nonnamaker, 4,317,479 to McDonald and 4,318,436 to Shurman.

In U.S. Pat. No. 4,256,159 issued to Williams, there is disclosed a method and apparatus for applying identifying markings, such as letters, on vehicle tires. Under the Williams procedure, the tire surface is first prepared to receive the marking, a first layer of rubber latex is then vulcanized to the surface of the tire, a second layer of elastomeric material is then secured to the first layer, and, finally, a foil leaf material is hot stamped into the second layer.

Although its method and apparatus does not require the use of specially manufactured tires, Williams is more suitable for high volume commercial applications due to the complexity and expense of the procedure and due to the permanence of the markings applied to the tires.

SUMMARY OF THE INVENTION

A principal object of this invention is therefore to provide a method for applying personalized alphanumeric characters and the like to a tire such that any individual could easily and quickly apply the markings to his own tires.

Another object of this invention is to provide for the easy replacement or interchangeability of the alphanumeric characters.

An additional object of this invention is to provide a method for accurately applying a series of characters in a loose letter or die-cut application on the sidewall of a tire and for aligning each character an equal distance from the rim of the tire.

A further object of this invention is to provide a method for centering the series of characters radially on the sidewall of a tire and an apparatus for accurately marking 90° intervals along the sidewall of a tire for symmetric applications.

Another object of this invention is to provide an adjustable or modifiable apparatus for accurately marking 90° intervals along the sidewall of a variety of different radius tires and for accurately spacing the characters from each other, both within the same word and between different words.

A still further object of this invention is to provide an apparatus for accurately centering the series of characters radially on the sidewall of a tire and for accurately spacing each character or the series of characters from the rim of the tire.

Briefly described, the present invention comprises a method of and apparatus for applying a personalized series of alphanumeric characters and the like to the sidewall of a tire.

The claimed method includes placing a reference point on the outer sidewall of the tire being adorned, the series of alphanumeric characters about the reference point, aligning the series of alphanumeric characters a predetermined distance from the rim of the tire, and attaching the series of alphanumeric characters with a strong adhesive to the sidewall of the tire.

The claimed apparatus includes referencing means for dividing and marking the sidewall of the tire into quadrants, and spacing means for accurately spacing the alphanumeric characters relative to each other and relative to the rim of the tire.

The referencing means comprises a centering gauge, substantially in the shape of an arcuate plate, for measuring at least one 90° interval of the tire. The measuring plate has at least an adjustable or modifiable semicircular outer edge designed to fit adjacent the inside rim of a variety of different radius tires.

The spacing means comprises a spacing gauge, which comprises a T-shaped, thin arcuate plate designed to fit slidably adjacent the centering gauge or the rim of the tire. The T-shaped plate has a base and a rectangular stem. The base has at least two parallel curved edges. The inner edge of the spacing gauge is contoured to engage the outer edge of the centering gauge. The outer edge is contoured to provide a surface against which the base of the alphanumeric characters can be aligned along the curvature of the sidewall of the tire. The stem projects perpendicularly from the outer edge of the base, away from the inner edge of the base, and along the same plane as the base. The length of the stem should be at least the height of the alphanumeric characters being applied to the sidewall. The width of the stem is equal to the desired spacing between each alphanumeric character. The edges of the stem are straight to provide a surface against which the side of the alphanumeric characters can be aligned along a radial axis of the tire.

Other objects, features and advantages of the present invention will become apparent upon reading the following specification, when taken in conjunction with the accompanying drawings.

BRIEF DESCRIPTION OF THE DRAWINGS

FIG. 1 is a perspective view of a standard pneumatic tire mounted below an automobile frame and displaying a series of alphanumeric characters applied to the sidewall of the tire;

FIG. 2 is a perspective view of an adjustable spacing gauge slidably mounted upon a centering gauge;

DETAILED DESCRIPTION OF THE PREFERRED EMBODIMENT

Figure 4:
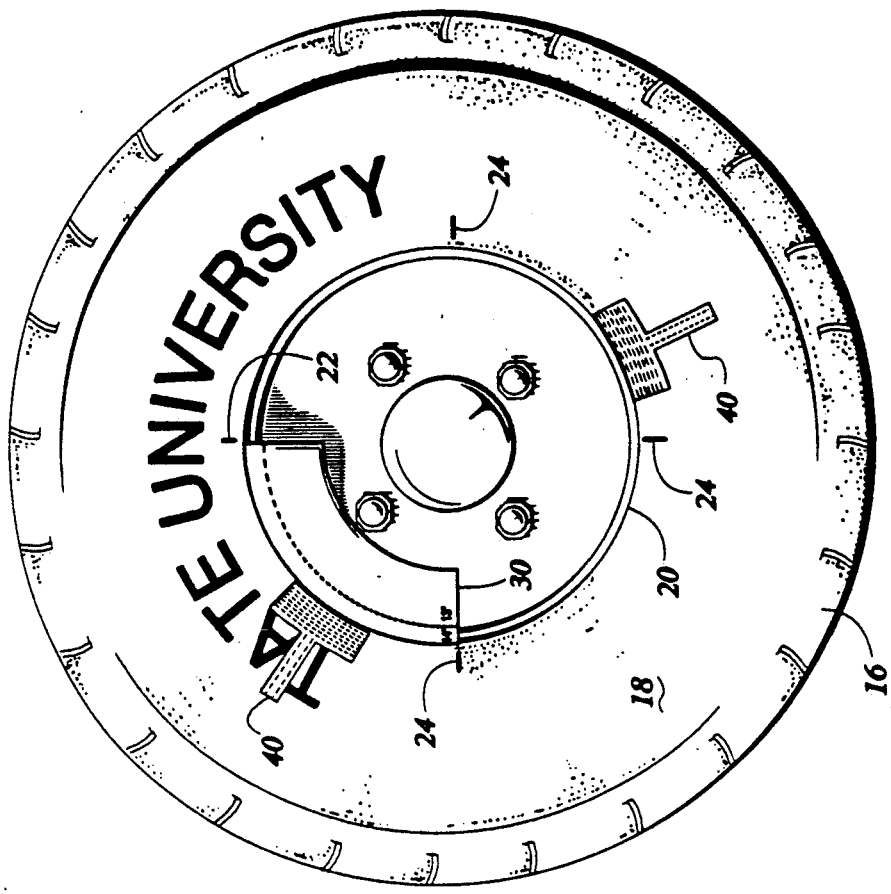
FIG. 4 is a side elevational view of a pneumatic tire with alphanumeric characters in the process of being applied.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a method and apparatus for applying alphanumeric characters to a standard pneumatic tire. Referring to FIG. 1, there is illustrated a standard pneumatic tire 10 mounted below a vehicle 5. FIG. 1 illustrates the finished product of this invention. A completed series of the alphanumeric characters 12 has been applied to and is displayed on the sidewall 18 of the tire. As used herein, alphanumeric characters shall be understood to include team mascots, logos, and any other symbols which can be produced from a suitable material and which would lend themselves to display on the sidewall of a tire.

Figure 3:
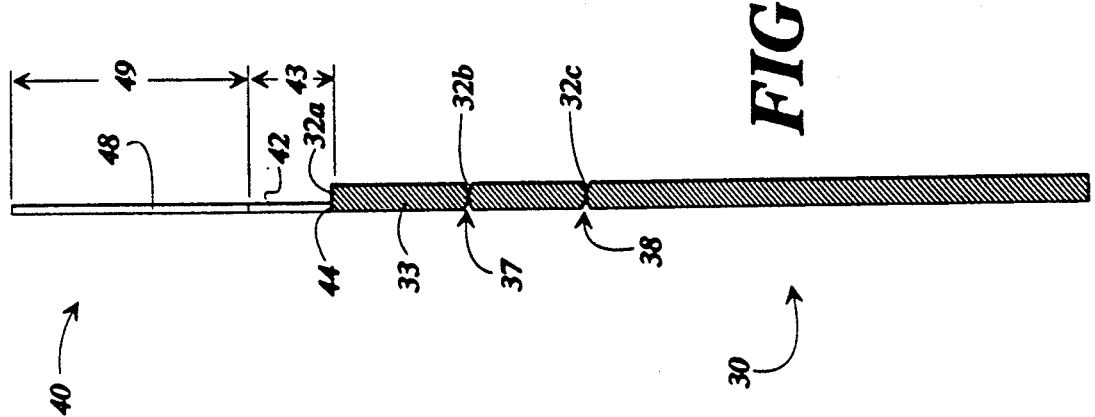
FIG. 3 is an enlarged cross-sectional view of the centering gauge and spacing gauge of FIG. 2, the section being taken on line 3—3 of FIG. 2.

FIG. 2 is a perspective view of an adjustable spacing gauge 40 slidably mounted upon a centering gauge, both of which are used to accurately apply alphanumeric characters onto the sidewall of a tire. FIG. 3 is an enlarged cross sectional view of the spacing gauge and the centering gauge shown in FIG. 2. These gauges may be made from paper, cardboard, plastic, metal, or other suitable material.

Centering gauge 30 is an arcuate plate with an inner edge 31, an outer edge 32a and radial edges 35 and 36. The angle between radial edges 35, 36 should be 90°. In the embodiments shown, the centering gauge is designed to be used with a 15 inch pneumatic tire. The centering gauge can also be modified for use with different sized tires. For example, for use with a 14-inch tire, strip 33 can be removed from the centering gauge along perforation line 37 so that outer edge 32b would then define the outer edge of the centering gauge. Similarly, for use with a 13-inch tire, both strips 33 and 34 can be removed along perforation line 38. In this case, outer edge 32c would define the outer edge of the centering gauge. The curvatures of each outer edge 32a, 32b, and 32c are equivalent and match the circular curvature of the rim of a tire.

Spacing gauge 40 is illustrated adjacent the outer edge 32a of the centering gauge. As stated above, this configuration would be used with a 15-inch tire. For use with a 14-inch tire the spacing gauge would be adjacent the outer edge 32b; and, for a 13-inch tire, the spacing gauge would be adjacent the outer edge 32c. The spacing gauge comprises a base 42 and an upwardly projecting stem 48. The base has an inner arcuate edge 44 and an outer arcuate edge 46. The curvature of both arcuate edges matches the curvature of the outer edges of the centering gauge. The height 43 of base 42 can be modified by cutting along one of the rim spacing cut lines 45 of the base. The length 49 of the stem 48 should be at least the height of the alphanumeric characters being applied to the tire. The width 50 of the stem can be decreased by cutting along the letter spacing cut lines 51. A preferred method of applying alphanumeric characters in a loose letter application according to this invention is described below. The characters may be applied to the tire before or after it has been mounted on a vehicle. For illustrative purposes, it will be assumed that the tire upon which the characters will be applied has a 14-inch radius, as shown in FIG. 4.

The user must first adapt the centering gauge 30 and spacing gauge 40 to the tire upon which the alphanumeric characters will be applied. The centering gauge is modified for the 14-inch tire of FIG. 4, as stated above, by removing strip 33. The spacing gauge can also be modified, if necessary, as stated above. The height 43 of the base 42 should be adjusted so that characters applied to the tire are approximately centered on the sidewall of the tire between the treads 16 and rim 20. The width 50 of the stem 48 can be decreased according to the user's preference or if a lengthy series of letters is being applied. The centering gauge and spacing gauge could also be manufactured for specified tire sizes and, thus, the adaptation described above would not be necessary. Similarly, the gauges can be manufactured in modular form in which portions of the gauge removed for a selected application could be reattached to the gauge for later use on a different size tire or for different spacings between letters, words, etc.

The sidewall 18 of the tire should initially be cleaned with a rubber cleaner such as a suitable solvent. The user can then choose an approximate location along the tire where they would prefer to center the personalized alphanumeric characters. A reference point 22 is then marked near the rim 20 of the tire with a pen, chalk or the like. For symmetric applications, three symmetry points 24, spaced at 90° intervals, can likewise be marked near the rim of the tire using spacing gauge 30. The spacing gauge can be slid or positioned along the inside of rim 20, and the 90° interval can be accurately measured using the distance between radial edges 35 and 36.

The characters to be applied to the tire can be secured thereto with contact cement, epoxy, or other suitable adhesive means, with tape on the back of the characters, or by other suitable means. If contact cement is used, it is applied to the tire sidewall after cleaning of the sidewall and allowed to dry. The cement is also applied to the back of the characters, which can have a non-stick paper covering with securement being effected in a conventional manner, pressing together the opposing pre-coated dry surfaces.

Using basic geometric principles, the center location of the alphanumeric series is then determined. For example, the middle letter of a word with an odd number of characters denotes the center location, such as the A in STATE. For a word with an even number of characters, such as UNIVERSITY, the space between the E and the R denotes the center location. The same principle can be applied to a string of words, or the like, by counting the space between words as one or more characters. As shown in FIG. 4, the space between the N and I denotes the center location of the phrase STATE UNIVERSITY.

Once the center location of the series is determined, the characters can be applied to the sidewall of the tire one at a time as follows. The spacing gauge is first placed against the sidewall of the tire and centered over reference point 22 with inner arcuate edge 44 adjacent either the outer edge 32b of the centering gauge, as shown by spacing gauge 40a, or adjacent the rim 20 of the tire, as shown by spacing gauge 40b. The letter I, which can have a non-stick paper backing, has the paper removed therefrom and is placed on the sidewall and aligned using outer arcuate edge 46 of base 42 and the right edge of stem 48 of the spacing gauge. The letter is firmly pressed or hammered into place. The spacing gauge can then be moved right or left along the centering gauge or rim of the tire. Each character of the series can be applied to the tire according to the above technique, using the spacing gauge to ensure proper alignment and spacing between each letter and the rim of the tire.

For symmetric applications (not shown), the first series of characters, such as STATE, could be centered around reference point 22. The second series of characters such as UNIVERSITY, could be centered around a symmetry point 24 located 180° from the reference point along the sidewall of the tire. The centering of each word, alignment and application of each character corresponds to the same method described above for non-symmetric applications.

For die-cut applications, in which the spacing between each letter of a word is factory-set, the spacing gauge is used for proper spacing between each die-cut word and between the die-cut word and the rim of the tire.

While this invention has been described in detail with particular reference to a preferred embodiment thereof, it will be understood that variations and modifications can be effected within the scope and spirit of the invention as described hereinbefore and as defined in the appended claims.

I claim:

1. An apparatus for ensuring proper application of a personalized series of alphanumeric characters and the like which are applied to the sidewall of a pneumatic tire or the like, comprising:
   referencing means including a centering gauge having a measuring plate for measuring at least one 90° interval of the tire, said measuring plate having an arcuate outer edge, said outer edge designed to fit adjacent the rim of a plurality of different sized tires for dividing the sidewall of the tire into quadrants so they can be marked with reference points; and
   spacing means for accurately spacing the alphanumeric characters relative to each other and relative to the rim of the tire.

2. An apparatus for ensuring proper application of a personalized series of alphanumeric characters and the like which are applied to the sidewall of a pneumatic tire or the like, comprising:
   referencing means for dividing the sidewall of the tire into quadrants; and
   a spacing gauge for spacing the alphanumeric characters relative to each other and relative to the rim of the tire, said spacing gauge comprising a T-shaped thin plate including a base with at least first and second arcuate and parallel edges, said first arcuate edge contoured to engage either the rim of the tire or an arcuate edge of said referencing means, said second arcuate edge laterally displaced from said first arcuate edge to provide a contoured surface parallel to the curvature of the tire with which alphanumeric characters can be aligned a predetermined distance from the rim of the tire; and
   a rectangular stem projecting perpendicularly from said second arcuate edge, away from said first arcuate edge and along the same plane as said base, the length of said rectangular stem at least as great as the length of the alphanumeric characters to be applied to the sidewall of the tire, the width of said rectangular stem equal to the desired spacing between each alphanumeric character.

3. A method of applying a personalized series of alphanumeric characters to the sidewall of a tire or the like, utilizing an apparatus comprising:
   referencing means including a centering gauge having a measuring plate for measuring at least one 90° interval of the tire, said measuring plate having an arcuate outer edge, said outer edge designed to fit adjacent the rim of a plurality of different sized tires for dividing the sidewall of the tire into quadrants so they can be marked with reference points; and
   spacing means for accurately spacing the alphanumeric characters relatively to each other and relatives to the rim of the tire;
   said method comprising the steps of:
   placing a reference point on the outer sidewall of the tire being adorned;
   centering the series of alphanumeric characters about the reference point;
   aligning the series of alphanumeric characters a predetermined distance from the rim of the tire; and
   attaching the series of alphanumeric characters to the sidewall of the tire with an adhesive means.

4. A method as described in claim 3 wherein the step of centering the series of alphanumeric characters about the reference point comprises:
   counting the number of characters and spaces in the personalized series;
   determining the center location of the series; and
   aligning the center location of the series with the reference point.

5. A method as described in claim 3 wherein the step of aligning the series of alphanumeric characters a predetermined distance from the rim of the tire further comprises:
   radially centering the series on the surface of the sidewall between the rim and treads of the tire; and
   ensuring that the bottom of each character in the series is equidistant from the rim.

* * * * *